(12) United States Patent
Hodoya et al.

(10) Patent No.: US 10,538,213 B2
(45) Date of Patent: Jan. 21, 2020

(54) VEHICLE FRAME MEMBER

(71) Applicants: AISIN SEIKI KABUSHIKI KAISHA, Kariya-shi, Aichi-ken (JP); AISIN KEIKINZOKU KABUSHIKI KAISHA, Imizu-shi, Toyama-ken (JP)

(72) Inventors: Kohei Hodoya, Novi, MI (US); Kiyoichi Kita, Okazaki (JP); Jun Shobo, Anjo (JP)

(73) Assignees: Aisin Seiki Kabushiki Kaisha, Kariya-shi, Aichi-ken (JP); Aisin Keikinzoku Kabushiki Kaisha, Kmizu-shi, Toyama-ken (JP)

( * ) Notice: Subject to any disclaimer, the term of this patent is extended or adjusted under 35 U.S.C. 154(b) by 58 days.

(21) Appl. No.: 15/821,592

(22) Filed: Nov. 22, 2017

(65) Prior Publication Data

US 2018/0148009 A1 May 31, 2018

(30) Foreign Application Priority Data

Nov. 28, 2016 (JP) .................................. 2016-230072

(51) Int. Cl.
*B62D 25/00* (2006.01)
*B60R 19/18* (2006.01)

(52) U.S. Cl.
CPC .............. *B60R 19/18* (2013.01); *B62D 25/00* (2013.01); *B60R 2019/1826* (2013.01)

(58) Field of Classification Search
CPC ............ B60R 19/18; B60R 2109/1813; B60R 2019/1826; B62D 25/00
See application file for complete search history.

(56) References Cited

U.S. PATENT DOCUMENTS

| 6,179,355 B1 * | 1/2001 | Chou ...................... B60R 19/18 188/377 |
| 2008/0093867 A1 | 4/2008 | Glasgow et al. |

FOREIGN PATENT DOCUMENTS

| JP | 2005-145168 | 6/2005 |
| JP | 2005-306294 | 11/2005 |
| JP | 2010-507532 | 3/2010 |
| JP | 2016-97860 | 5/2016 |

\* cited by examiner

*Primary Examiner* — D Glenn Dayoan
*Assistant Examiner* — Melissa Ann Bonifazi
(74) *Attorney, Agent, or Firm* — Finnegan, Henderson, Farabow, Garrett & Dunner, LLP

(57) ABSTRACT

A vehicle frame member includes a first wall portion formed into a band plate shape extending in a predetermined direction, a second wall portion and a third wall portion formed into a band plate shape extending in the predetermined direction, the second wall portion and the third wall portion extending in a first direction and in a second direction, respectively, from opposite ends of the first wall portion in a width direction of the first wall portion. Respective recessed groove portions extending in the predetermined direction are formed on respective outer surfaces of the second wall portion and the third wall portion.

5 Claims, 11 Drawing Sheets

VEHICLE FRAME MEMBER

INCORPORATION BY REFERENCE

The disclosure of Japanese Patent Application No. 2016-230072 filed on Nov. 28, 2016 including the specification, drawings and abstract is incorporated herein by reference in its entirety.

BACKGROUND

1. Technical Field

The present disclosure relates to a vehicle frame member.

2. Description of Related Art

As described in Japanese Patent Application Publication No. 2005-145168 (JP 2005-145168 A), a bumper reinforcement attached to a front end or a rear end of a vehicle is known as one of vehicle frame members. When an object collides with the vehicle, the bumper reinforcement deforms, so that an impact applied to the vehicle is absorbed.

For example, there has been known a bumper reinforcement BR1 having a sectional shape (a sectional shape perpendicular to a longitudinal direction) as illustrated in FIG. 11. The bumper reinforcement BR1 is disposed in a front end of a vehicle. As illustrated in FIG. 11, the bumper reinforcement BR1 includes a first wall portion W1 to a fifth wall portion W5. The first wall portion W1 is formed in a band plate shape extending in a vehicle width direction (a direction perpendicular to a plane of paper in FIG. 11). One wall surface of the first wall portion W1 is directed toward a front side of the vehicle. A central part of the first wall portion W1 in a vehicle height direction is recessed toward a passenger compartment side. That is, a recessed groove portion extending in the vehicle width direction is formed in the central part of the first wall portion W1 in the vehicle height direction. The second wall portion W2 and the third wall portion W3 are formed into a band plate shape extending in the vehicle width direction, and also extend toward a vehicle rear side (the passenger compartment side) from an upper end and a lower end of the first wall portion W1, respectively. Further, the fourth wall portion W4 and the fifth wall portion W5 are formed into a band plate shape extending in the vehicle width direction, such that the fourth wall portion W4 extends upward from a rear end of the second wall portion W2 and the fifth wall portion W5 extends downward from a rear end of the third wall portion W3. As such, the bumper reinforcement BR1 is a groove-shaped member opened toward the passenger compartment side. In a state where a load is applied to the first wall portion W1 from a front side, the second wall portion W2 and the third wall portion W3 function as reinforcing portions (ribs) for the first wall portion W1.

Further, there has been also known a bumper reinforcement having a sectional shape changed from that in FIG. 1. For example, in a bumper reinforcement BR2 illustrated in FIG. 12, a fourth wall portion W4 extends downward from a rear end of a second wall portion W2 and a fifth wall portion W5 extends upward from a rear end of a third wall portion W3 (that is, toward a space surrounded by a first wall portion, the second wall portion, and the third wall portion). Further, in a bumper reinforcement BR3 illustrated in FIG. 13, the recessed groove portion formed in the first wall portion W1 of the bumper reinforcement BR1 is omitted. That is, a first wall portion W1 is formed in a flat shape.

Rear surfaces of the bumper reinforcements BR1, BR2, BR3 are opened toward the passenger compartment side, but as illustrated in FIG. 14, there has been also known a bumper reinforcement BR4 having a closed rear surface. That is, the bumper reinforcement BR4 is a cylindrical member. In other words, a fourth wall portion W4 (or a fifth wall portion W5) has a configuration similar to a first wall portion W1, and an upper end and a bottom end of the fourth wall portion W4 (or the fifth wall portion W5) are connected to respective rear ends of the second wall portion W2 and the third wall portion W3.

SUMMARY

When an impact load is applied to a front surface of the first wall portion W1 of the bumper reinforcement BR1, BR2, BR3, BR4, the bumper reinforcement BR1, BR2, BR3, BR4 deforms. In a case where the rear surface is opened like the bumper reinforcement BR1, BR2, BR3, a sectional shape thereof easily deforms largely at an initial stage in the course of deformation. More specifically, at the initial stage of the course of deformation, intermediate parts of the second wall portion W2 and the third wall portion W3 bend. That is, the second wall portion W2 and the third wall portion W3 buckle. Accordingly, the second wall portion W2 and the third wall portion W3 do not function as the reinforcing portions for the first wall portion W1. Accordingly, when the bumper reinforcement BR1, BR2, BR3 just receives a relatively small load, its deformation proceeds. As a result, an impact to be absorbed by the bumper reinforcement BR1, BR2, BR3 is relatively small.

In contrast, in a case where the rear surface is closed like the bumper reinforcement BR4, the sectional shape of the bumper reinforcement BR4 can hardly change at the initial stage of the course of deformation. Accordingly, the second wall portion W2 and the third wall portion W3 sufficiently function as the reinforcing portions for the first wall portion W1. On this account, when the bumper reinforcement BR4 receives a relatively large load, its deformation proceeds. As a result, an impact to be absorbed by the bumper reinforcement BR4 is relatively large (see FIGS. 7 to 9).

However, a manufacturing cost of the bumper reinforcement BR4 having a closed rear surface is higher than the bumper reinforcement BR1, BR2, BR3 having an opened rear surface. For example, in a case of using an extrusion molding method, a mold structure for manufacturing the bumper reinforcement BR4 having a closed rear surface is more complicated and higher in cost than a mold structure for manufacturing the bumper reinforcement BR1, BR2, BR3 having an opened rear surface. Further, in a case of using a roll forming method, for example, when the bumper reinforcement BR4 having a closed rear surface is manufactured, it is necessary to deform a band-plate shaped plate material cylindrically by use of roll pieces and to weld both ends of the plate material in a width direction. Further, in a case where quenching is performed on the bumper reinforcement BR4, it is difficult to remove oxide formed on an inner peripheral surface thereof. Further, it is difficult to apply an antirust paint to the inner peripheral surface of the bumper reinforcement BR4.

The present disclosure has been accomplished in order to solve the above problems, and an object of the present disclosure is to provide a vehicle frame member having a groove shape in which one side surface (a side surface opposite to a surface to which a load is applied) is opened, the vehicle frame member having improved impact absorption performance.

A vehicle frame member according to an aspect of the disclosure includes a first wall portion formed into a band plate shape extending in a predetermined direction, a second wall portion formed into a band plate shape extending in the predetermined direction, and a third wall portion formed into a band plate shape extending in the predetermined direction. The second wall portion extends in a first direction from one end of the first wall portion in a width direction of the first wall portion. The third wall portion extends in a second direction from the other end of the first wall portion in the width direction of the first wall portion. A first recessed groove portion extending in the predetermined direction is formed on an outer surface of the second wall portion. A second recessed groove portion extending in the predetermined direction is formed on an outer surface of the third wall portion.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
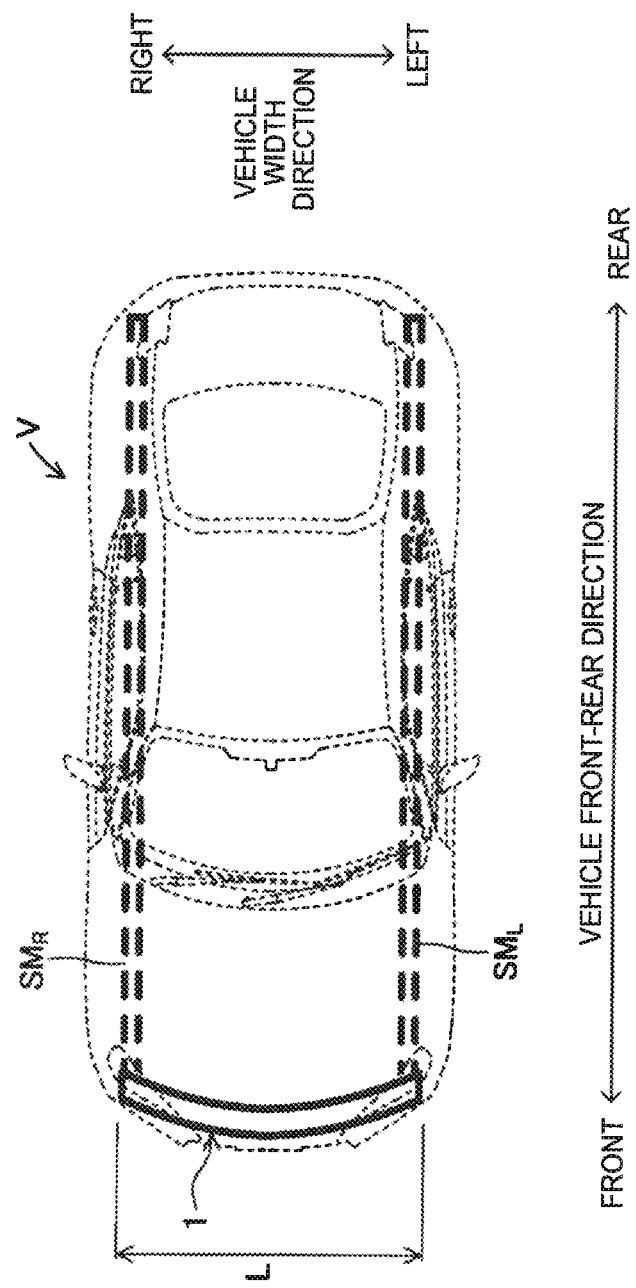
FIG. 1 is a schematic view of a vehicle to which a bumper reinforcement of one embodiment of the present disclosure is applied.

The following describes a bumper reinforcement 1 according to one embodiment of the present disclosure. First described is an outline of a vehicle V to which the bumper reinforcement 1 is applied. As illustrated in FIG. 1, the vehicle V includes a pair of right and left side member $SM_R$, $SM_L$ and the bumper reinforcement 1.

The side members $SM_R$, $SM_L$ are placed on opposite sides in a vehicle width direction. The side members $SM_R$, $SM_L$ are formed in a squarely cylindrical shape extending in a vehicle front-rear direction. Respective flange portions are provided in respective front end faces of the side members $SM_R$, $SM_L$. The bumper reinforcement 1 is attached to the flange portions of the side members $SM_R$, $SM_L$.

Figure 2:
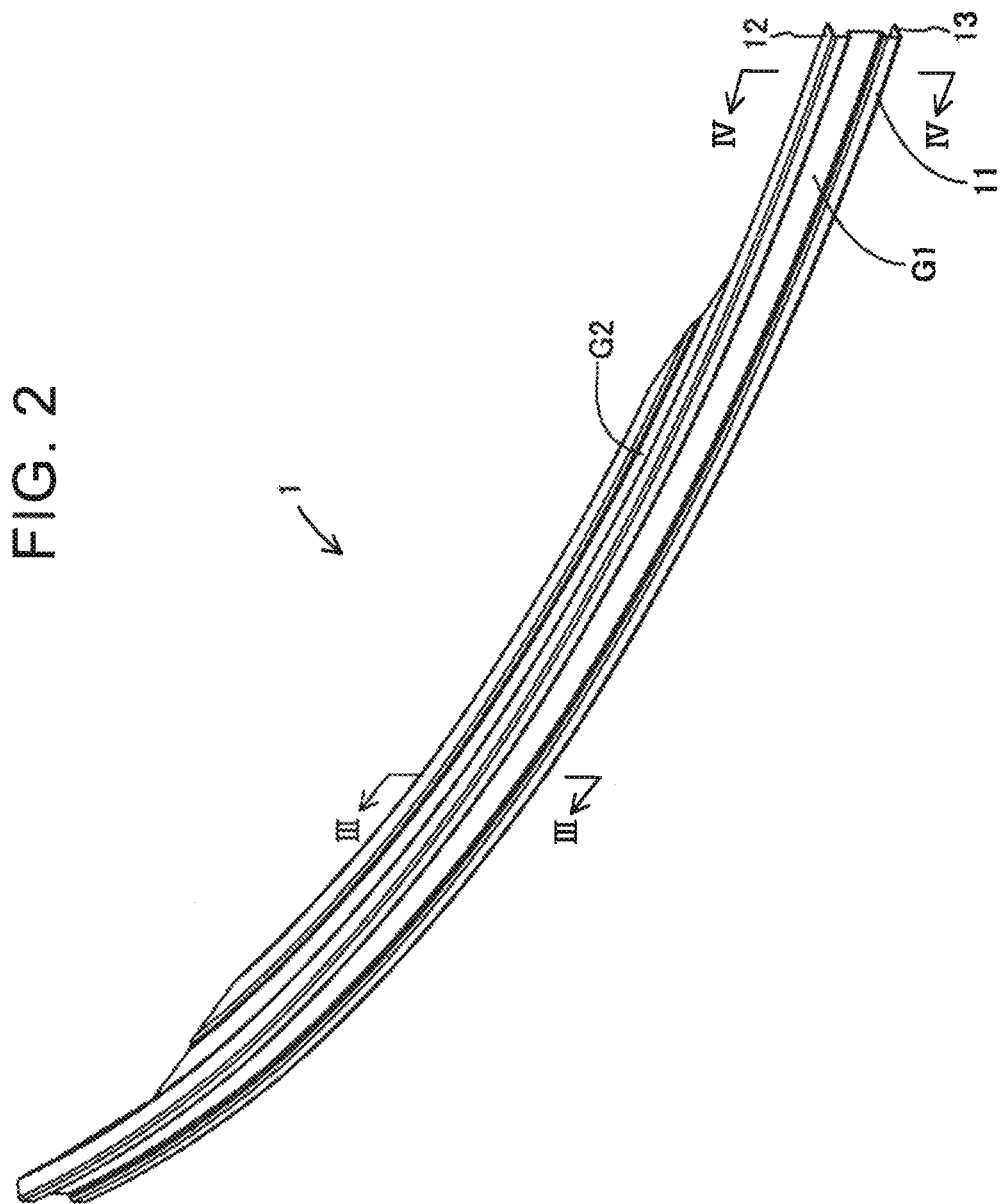
FIG. 2 is a perspective view of the bumper reinforcement in FIG. 1 viewed from a diagonally forward left side of the vehicle.
Figure 3:
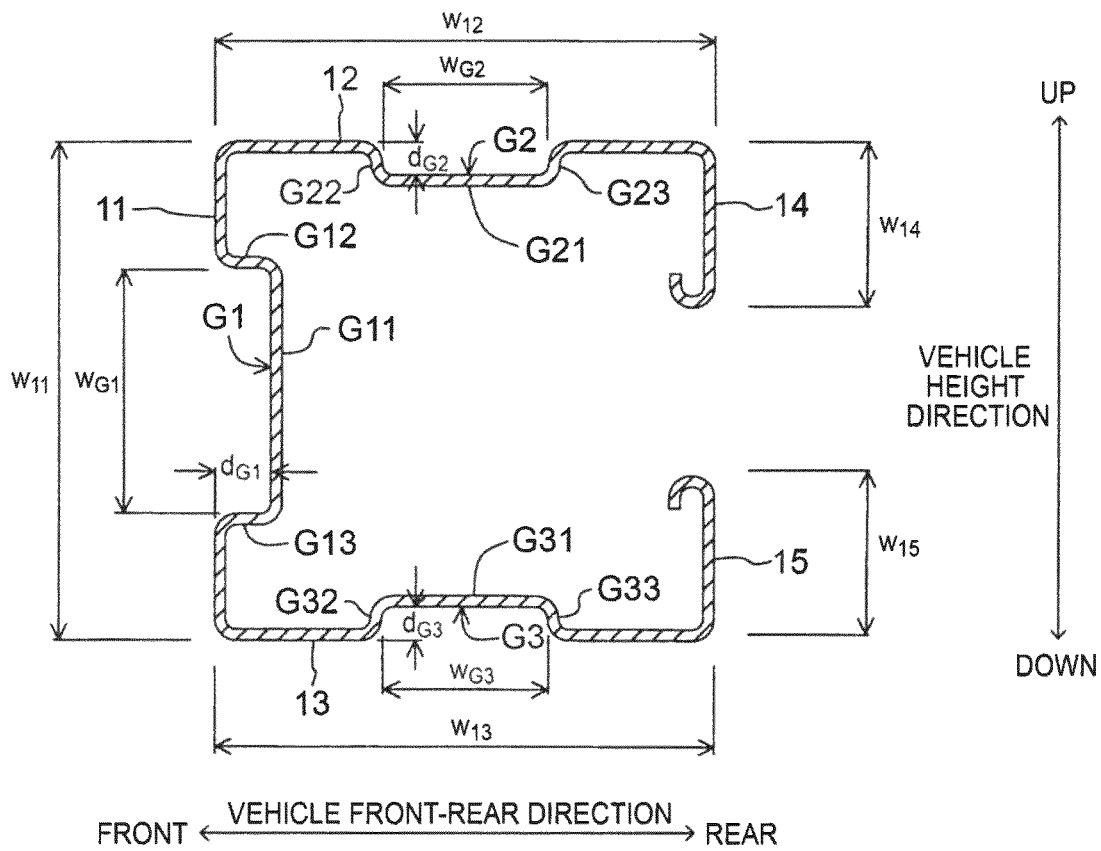
FIG. 3 is a sectional view taken along a line III-III in FIG. 2.
Figure 4:
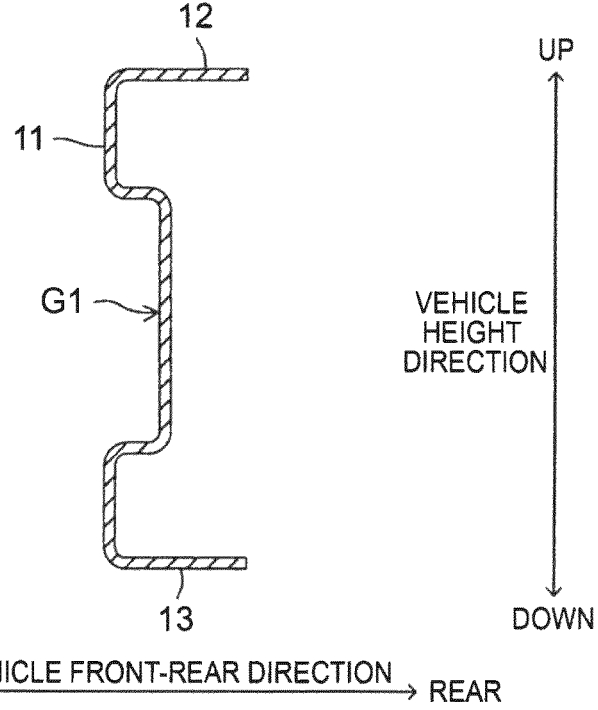
FIG. 4 is a sectional view taken along a line IV-IV in FIG. 2.

Next will be described a configuration of the bumper reinforcement 1, more specifically. The bumper reinforcement 1 is a groove-shaped member extending in the vehicle width direction as illustrated in FIGS. 2 to 4. That is, the bumper reinforcement 1 has a space thereinside, and its side surface (rear face) on a passenger compartment side is opened. In a plan view, the bumper reinforcement 1 curves in an arch shape (see FIG. 1). That is, both ends of the bumper reinforcement 1 in the vehicle width direction are positioned on a slightly rear side relative to its central part. A curvature of the bumper reinforcement 1 is determined based on a design (a shape of a bumper cover) of a front end of the vehicle. That is, the bumper reinforcement 1 is curved along the bumper cover. A length L of the bumper reinforcement 1 in the vehicle width direction is 800 mm.

Further, the bumper reinforcement 1 has various through-holes (not shown) (e.g., a hole into which a fastening member (a rivet, a bolt, and the like) for fastening the bumper reinforcement 1 to the side member $SM_R$, $SM_L$ is inserted).

The bumper reinforcement 1 includes a first wall portion 11, a second wall portion 12, a third wall portion 13, a fourth wall portion 14 and a fifth wall portion 15. The first wall portion 11, the second wall portion 12, the third wall portion 13, the fourth wall portion 14 and the fifth wall portion 15 have the same wall thickness. The wall thickness of the first wall portion 11, the second wall portion 12, the third wall portion 13, the fourth wall portion 14 and the fifth wall portion 15 is 1 mm, for example.

The first wall portion 11 is formed into a band plate shape extending in the vehicle width direction, and one wall surface thereof is directed toward a front side (opposite to the passenger compartment side). A dimension $w_{11}$ of the first wall portion 11 in a vehicle height direction (a width direction of the first wall portion 11) is 45 mm, for example. A central part of the first wall portion 11 in the vehicle height direction is slightly recessed toward the rear side. That is, a shallow recessed groove portion G1 extending along a longitudinal direction of the first wall portion 11 is formed in the central part of first wall portion 11 in the vehicle height direction. The recessed groove portion G1 is constituted by a bottom wall portion G11 parallel to the vehicle height direction, and an upper wall portion G12 and a lower wall portion G13 extending forward from an upper end and a lower end of the bottom wall portion G11, respectively. A groove width $w_{G1}$ of the recessed groove portion G1 is 27 mm, for example. A groove depth $d_{G1}$ of the recessed groove portion G1 is 5 mm, for example.

The second wall portion 12 is formed into a band plate shape extending in the vehicle width direction, and one wall surface thereof faces upward. Further, a front end of the second wall portion 12 is connected to an upper end of the first wall portion 11. A dimension $w_{12}$ of the second wall portion 12 in the vehicle front-rear direction (a width direction of the second wall portion 12) is 45 mm, for example. A central part of the second wall portion 12 in the vehicle front-rear direction is slightly recessed toward a lower side. That is, a shallow recessed groove portion G2 extending along a longitudinal direction of the second wall portion 12 is formed in the central part of the second wall portion 12 in the vehicle front-rear direction. The recessed groove portion G2 is constituted by a bottom wall portion G21 parallel to the vehicle front-rear direction, and a front wall portion G22 and a rear wall portion G23 extending upward from a front end and a rear end of the bottom wall portion G21, respectively. A groove width $w_{G2}$ of the recessed groove portion G2 is 15 mm, for example. A groove depth $d_{G2}$ of the recessed groove portion G2 is 3 mm, for example.

The third wall portion 13 is formed into a band plate shape extending in the vehicle width direction, and one wall surface thereof faces downward. Further, a front end of the third wall portion 13 is connected to a lower end of the first wall portion 11. A dimension $w_{13}$ of the third wall portion 13 in the vehicle front-rear direction (a width direction of the third wall portion 13) is 45 mm, for example. A central part of the third wall portion 13 in the vehicle front-rear direction is slightly recessed toward an upper side. That is, a shallow recessed groove portion G3 extending along a longitudinal direction of the third wall portion 13 is formed in the central part of the third wall portion 13 in the vehicle front-rear direction. The recessed groove portion G3 is constituted by a bottom wall portion G31 parallel to the vehicle front-rear direction, and a front wall portion G32 and a rear wall portion G33 extending downward from a front end and a rear end of the bottom wall portion G31, respectively. A groove width $w_{G3}$ of the recessed groove portion G3 is 15 mm, for example. A groove depth $d_{G3}$ of the recessed groove portion G3 is 3 mm, for example.

The fourth wall portion 14 is formed into a band plate shape extending in the vehicle width direction, and one wall surface thereof faces rearward. An upper end of the fourth wall portion 14 is connected to a rear end of the second wall portion 12. A bottom end of the fourth wall portion 14 is turned around to the front side (that is, toward an inside of a space surrounded by the first wall portion 11, the second wall portion 12, and the third wall portion 13). That is, in a section (FIG. 3) of the bumper reinforcement 1, perpendicular to the longitudinal direction thereof, the bottom end of the fourth wall portion 14 forms a semicircular arc, and its radius is, for example, 1.5 mm. A dimension $w_{14}$ of the fourth wall portion 14 in the vehicle height direction (a width direction of the fourth wall portion 14) is 15 mm, for example.

The fifth wall portion 15 is formed into a band plate shape extending in the vehicle width direction, and one wall surface thereof faces rearward. The fifth wall portion 15 is positioned below the fourth wall portion 14. A bottom end of the fifth wall portion 15 is connected to a rear end of the third wall portion 13. An upper end of the fifth wall portion 15 is turned around to the front side (that is, toward the inside of the space surrounded by the first wall portion 11, the second wall portion 12, and the third wall portion 13). That is, in the section (FIG. 3) of the bumper reinforcement 1, perpendicular to the longitudinal direction thereof, the upper end of the fifth wall portion 15 forms a semicircular arc, and its radius is, for example, 1.5 mm. A dimension $w_{15}$ of the fifth wall portion 15 in the vehicle height direction (a width direction of the fifth wall portion 15) is 15 mm, for example.

Note that the fourth wall portion 14 and the fifth wall portion 15 are not formed in right and left ends of the bumper reinforcement 1. That is, the right and left ends of the bumper reinforcement 1 have a sectional shape as illustrated in FIG. 4. Further, respective dimensions of the second wall portion 12 and the third wall portion 13 in the vehicle front-rear direction in the right and left ends of the bumper reinforcement 1 are smaller than respective dimensions of the second wall portion 12 and the third wall portion 13 in the vehicle front-rear direction in the central part of the bumper reinforcement 1 in the longitudinal direction.

The bumper reinforcement 1 is manufactured through a roll forming step, a heat treatment step, a bending step, and a cutting step.

In the roll forming step, a flat-shaped metal steel sheet is subjected to roll forming, so that a roll-formed product having the same sectional shape as a sectional shape of the bumper reinforcement 1 is manufactured. The roll forming step is performed by use of a roll forming device.

Further, in the heat treatment step, the roll-formed product is heat-treated along its longitudinal direction. In the present embodiment, a heat treatment device for performing the heat treatment step is incorporated in the roll forming device.

Figure 5:
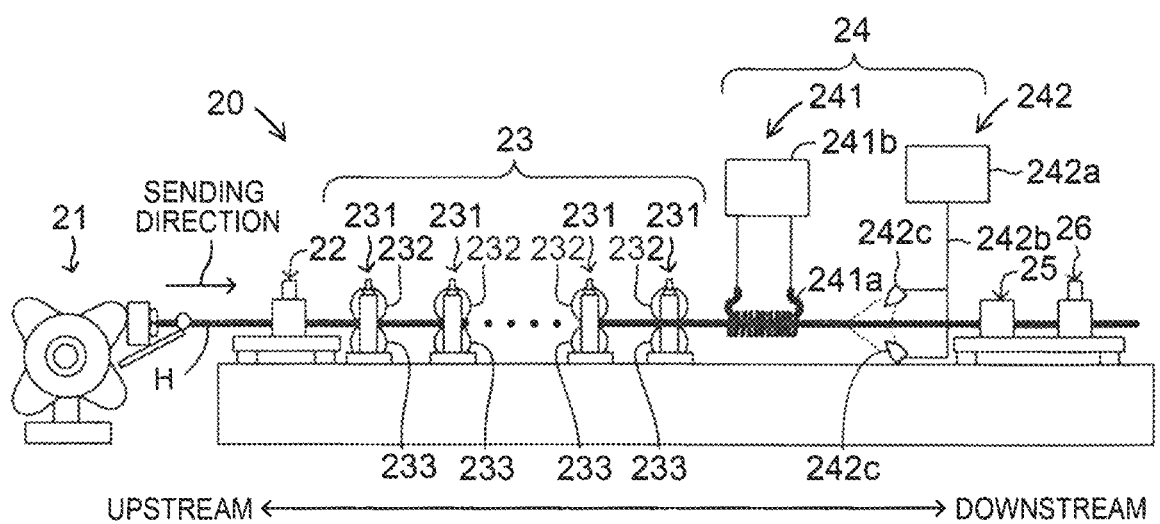
FIG. 5 is a schematic view of an apparatus for manufacturing a bumper reinforcement.

As illustrated in FIG. 5, the roll forming device 20 according to the present embodiment includes an uncoiler 21, a trimming device 22, and a molding roll unit 23, a roll quench unit 24 as the heat treatment device, a bending machine 25, and a cutoff device 26. These devices are aligned in this order along a pass line of the roll forming device 20. A steel strip H (a metal steel sheet) is sent from the uncoiler 21 side (an upstream side) toward the cutoff device 26 side (a downstream side). Here, as illustrated in FIG. 5, a sending direction of the steel strip H is defined as a direction from the upstream side toward the downstream side.

The uncoiler 21 includes a coiled portion around which the steel strip H is wound in a coil shape, and a rotating device for rotating the coiled portion. When the coiled portion rotates, the steel strip H is drawn out at a constant speed.

Figure 6:
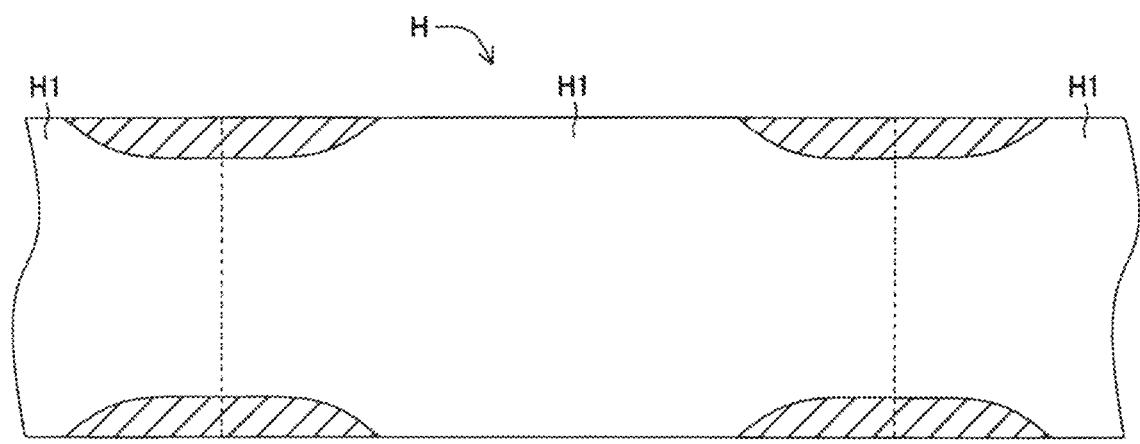
FIG. 6 is a plan view of a steel sheet illustrating a part to be trimmed in a trimming step.

As illustrated in FIG. 6, the trimming device 22 trims corners (parts indicated by oblique lines in FIG. 6) of a rectangular part H1 processed into one bumper reinforcement 1 in the steel strip H.

The molding roll unit 23 includes a plurality of molding roll stands 231. The molding roll stand 231 includes an upper roll piece 232 and a bottom roll piece 233 arranged on the upper side and on the lower side such that respective rotating axes are separated from each other in an up-down direction and placed in parallel to each other. When the bottom roll piece 233 rotates, the steel strip H is sent out. The upper roll piece 232 rotates by a frictional force between the upper roll piece 232 and the steel strip H thus sent out. Because of this, the upper roll piece 232 and the bottom roll piece 233 rotate at the same speed in opposite directions to each other.

The plurality of molding roll stands 231 is arranged in a linear shape along the sending direction of the steel strip H. The steel strip H sent out from the trimming device 22 is introduced into the molding roll unit 23. The steel strip H is deformed plastically every time the steel strip H passes between the upper roll piece 232 and the bottom roll piece 233 of each of the plurality of molding roll stands 231. Hereby, a roll-formed product in which a sectional shape of its intermediate part in a longitudinal direction is formed in the sectional shape as illustrated in FIG. 3 is manufactured (the roll forming step). Note that, as described above, the corners of the part H1 of the steel strip H are trimmed, so that both ends of the roll-formed product in the longitudinal direction have the sectional shape illustrated in FIG. 4. After the steel strip H is subjected to roll forming so that its section has a desired shape in the molding roll unit 23, the steel strip H is sent out to a downstream side relative to the molding roll unit 23.

The roll quench unit 24 is placed on the downstream side relative to the molding roll unit 23. The roll quench unit 24 includes an induction heater 241 and a coolant supply device 242, which are disposed in this order along the sending direction of the steel strip H.

The induction heater 241 is placed on the downstream side relative to the molding roll unit 23 in the sending direction of the steel strip H. The induction heater 241 includes an induction heating coil 241a placed so as to surround an outer periphery of the steel strip H that has passed through the molding roll stand 231 placed on the most downstream side, and a current control device 241b for controlling current application to the induction heating coil 241a. When the current control device 241b applies a current to the induction heating coil 241a, the steel strip H passing inside the induction heating coil 241a is heated instantly. In the present embodiment, a heating temperature is adjusted so that the roll-formed product is heated to a temperature higher than an austenitizing temperature.

The coolant supply device 242 includes a coolant source 242a, a supply pipe 242b connected to the coolant source 242a, and a coolant jet nozzle 242c attached to a tip end of the supply pipe 242b. A coolant from the coolant source 242a is supplied to the coolant jet nozzle 242c through the supply pipe 242b. Then, the coolant is jetted out from the coolant jet nozzle 242c. The coolant thus jetted out from the coolant jet nozzle 242c is sprayed onto the steel strip H that has passed through the induction heater 241. Hereby, a heated part is quenched to a temperature (e.g., a normal temperature) less than a martensitic transformation point. The heated part is thus heat-treated by this quenching. After that, the roll-formed product is sent into the bending machine 25 and the cutoff device 26. The steel strip H is bent along a bumper cover in the bending machine 25 (the bending step). Then, the roll-formed product is cut to a desired length by the cutoff device 26 (the cutting step). At this time, a boundary portion between a part H1 and a part H1 in the steel strip H. Thus, the bumper reinforcement 1 is manufactured.

When an object collides with a central part, in the vehicle width direction, of the vehicle V to which the bumper reinforcement 1 is applied, an impact load is applied to a central part of the bumper reinforcement 1 in the vehicle width direction. Hereby, the central part of the bumper reinforcement 1 in the vehicle width direction is pushed rearward, so that the bumper reinforcement 1 bends.

Here, like the bumper reinforcement BR1, BR2, BR3, BR4 in the related art, in a case where the second wall portion W2 and the third wall portion W3 are flat-shaped, a stress is easily concentrated on the central parts of the second wall portion W2 and the third wall portion W3 in the vehicle front-rear direction in the course of deformation of the bumper reinforcement BR1, BR2, BR3, BR4. Accordingly, at the initial stage of the course of deformation of the bumper reinforcement BR1, BR2, BR3, BR4, the second wall portion W2 and the third wall portion W3 buckle from the central part. In contrast, in the present embodiment, the recessed groove portion G2 and the recessed groove portion G3 are formed in the second wall portion 12 and the third wall portion 13, respectively. Hereby, in the second wall portion 12, a stress is dispersed to three parts, i.e., the recessed groove portion G2 and parts placed in front and behind the recessed groove portion G2. Further, in the third wall portion 13, a stress is dispersed to three parts, i.e., the recessed groove portion G3 and parts placed in front and behind the recessed groove portion G3. Thus, according to the present embodiment, the second wall portion 12 and the third wall portion 13 can hardly buckle in comparison with the case where the second wall portion W2 and the third wall portion W3 are flat-shaped.

Figure 11:
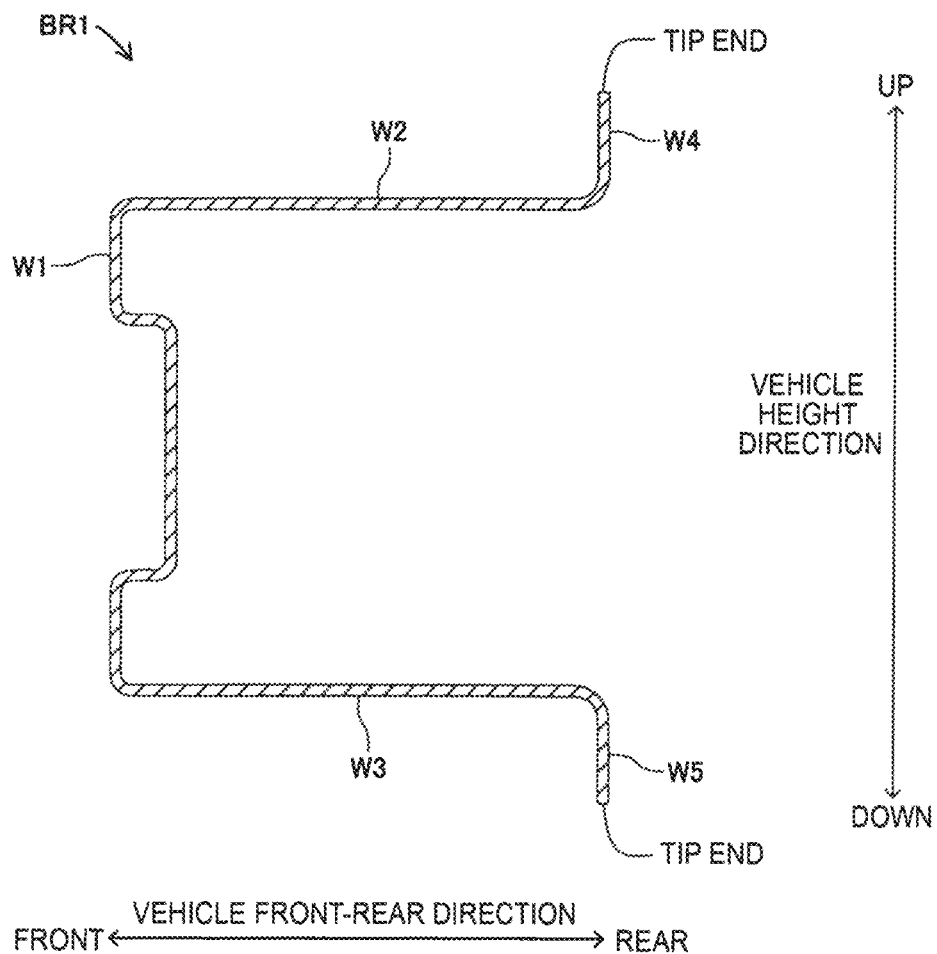
FIG. 11 is a sectional view illustrating a section of a first bumper reinforcement in the related art, the section being perpendicular to a longitudinal direction thereof.
Figure 12:
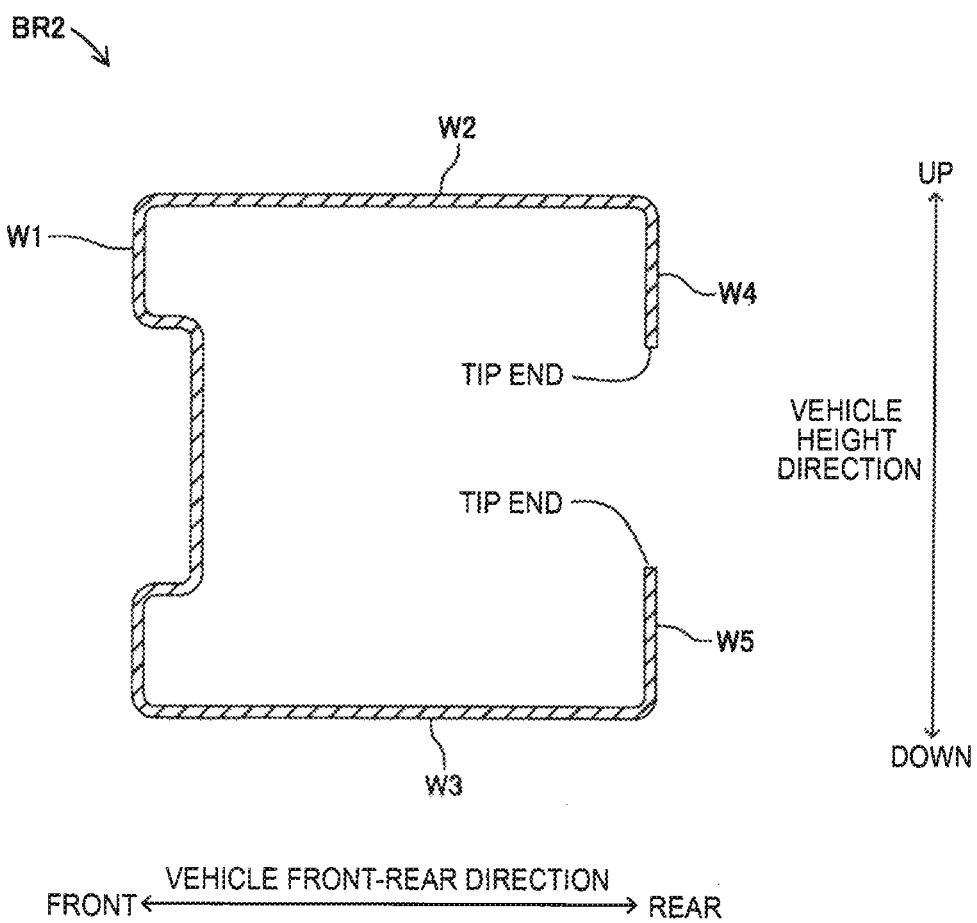
FIG. 12 is a sectional view illustrating a section of a second bumper reinforcement in the related art, the section being perpendicular to a longitudinal direction thereof.
Figure 13:
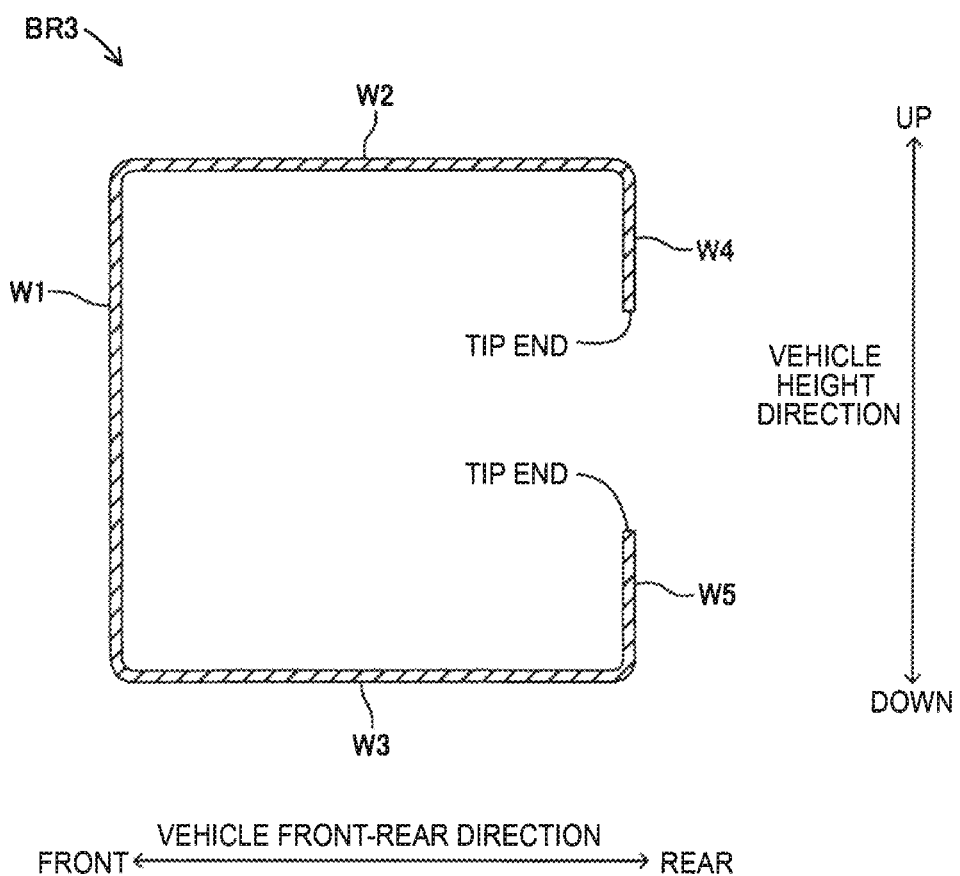
FIG. 13 is a sectional view illustrating a section of a third bumper reinforcement in the related art, the section being perpendicular to a longitudinal direction thereof.
Figure 14:
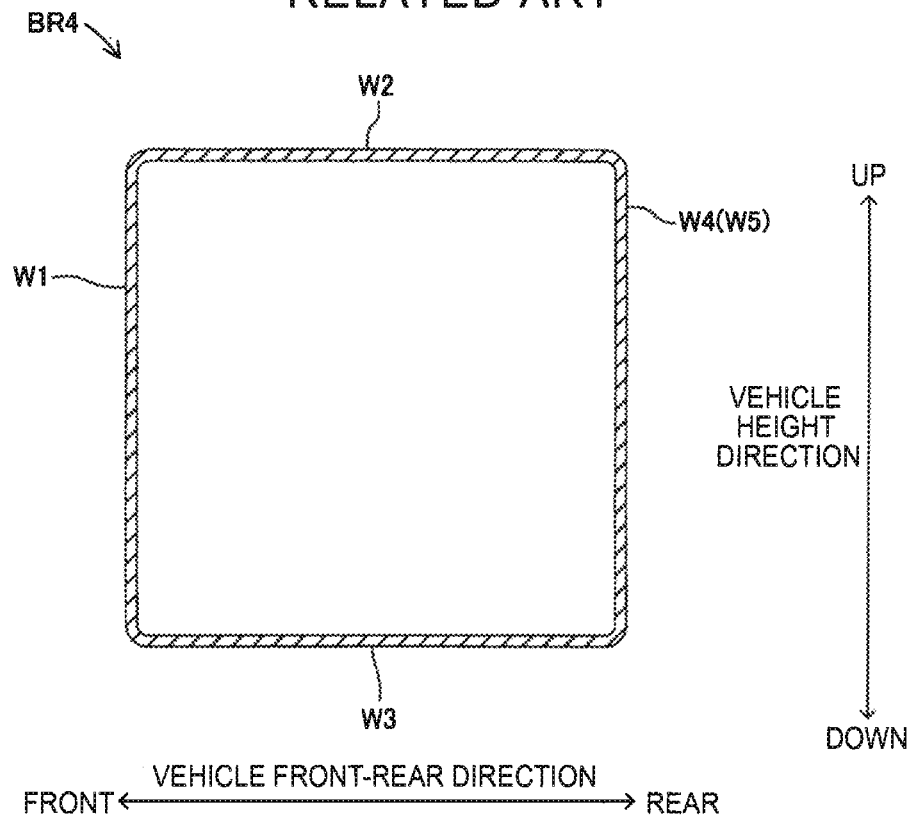
FIG. 14 is a sectional view illustrating a section of a fourth bumper reinforcement in the related art, the section being perpendicular to a longitudinal direction thereof.
Figure 15:
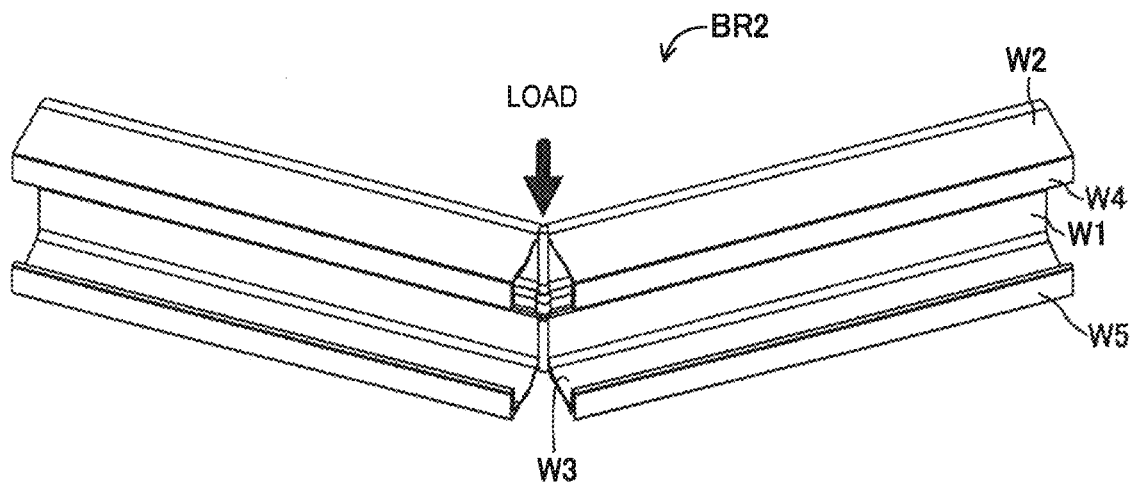
FIG. 15 is a perspective view illustrating a state where a bumper reinforcement in the related art is broken.

Further, in the course of deformation of the bumper reinforcement 1 or the bumper reinforcement BR1, BR2, BR3, BR4 in the related art, stresses (pulling stresses) directed toward both end sides in the vehicle width direction are applied to a rear part of the central part thereof in the vehicle width direction. In the case of the bumper reinforcement BR1, BR2, BR3 in the related art, the stresses are easily concentrated on tip ends (see FIG. 11 to FIG. 13) of the fourth wall portion W4 and the fifth wall portion W5 in the course of deformation thereof. Accordingly, at the initial stage of the course of deformation of the bumper reinforcement BR1, BR2, BR3, cracks are caused in the fourth wall portion W4 and the fifth wall portion W5 from the tip ends, and after that, the bumper reinforcement BR1, BR2, BR3 breaks (see FIG. 15). In contrast, in the present embodiment, the bottom end of the fourth wall portion 14 and the upper end of the fifth wall portion 15 are turned around in a curved manner (in a semicircular arc shape) (see FIG. 3). Accordingly, a stress is dispersed to those curved portions. In view of this, according to the present embodiment, cracks can be hardly caused in the bottom end of the fourth wall portion 14 and the upper end of the fifth wall portion 15 in comparison with the case where the fourth wall portion W4 and the fifth wall portion W5 are flat-shaped.

Figure 7:
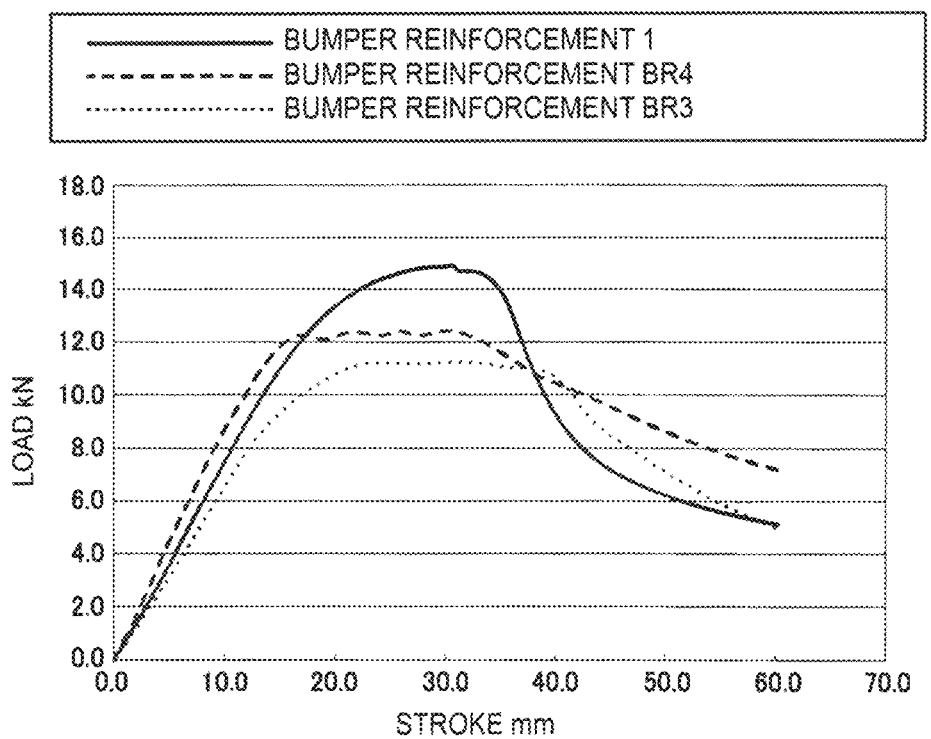
FIG. 7 is a graph in which impact absorption performance of a bumper reinforcement in the related art is compared with impact absorption performance of the bumper reinforcement of the present embodiment.
Figure 8:
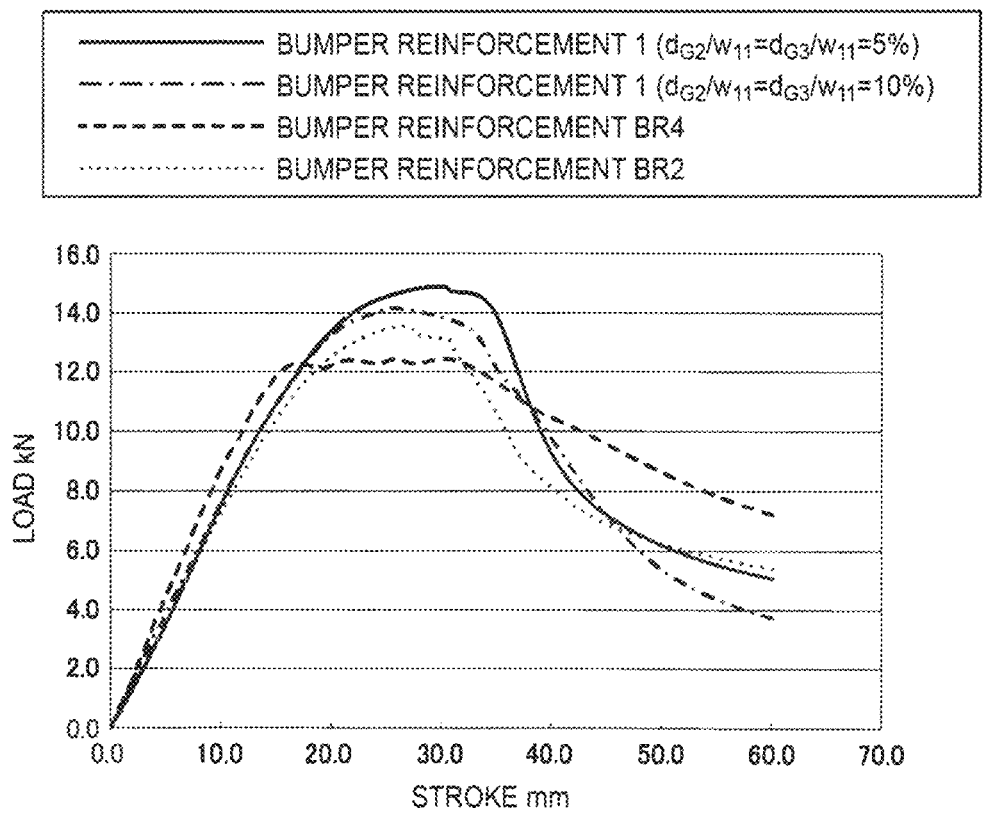
FIG. 8 is a graph illustrating a relationship of a depth of a recessed groove portion with the impact absorption performance.
Figure 9:
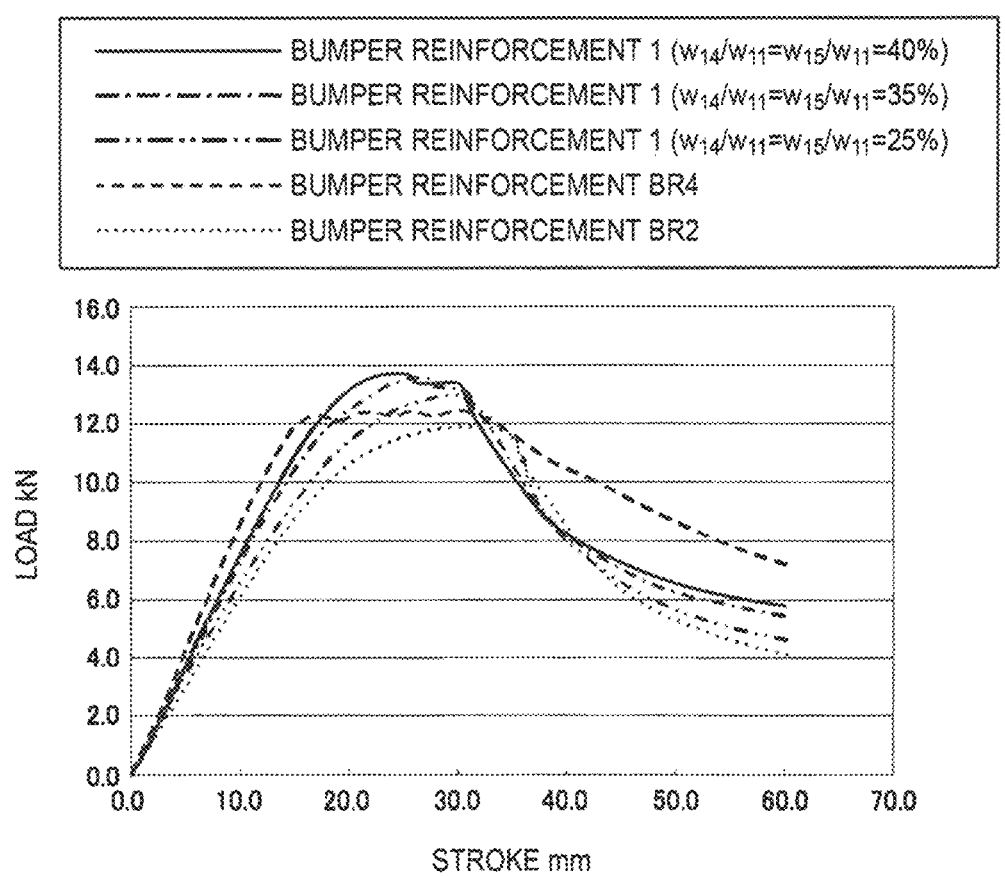
FIG. 9 is a graph illustrating a relationship of dimensions of a fourth wall portion and a fifth wall portion with the impact absorption performance.

Next will be described a test result about impact absorption performance of the bumper reinforcement 1 configured as described above. FIGS. 7 to 9 are characteristic graphs each illustrating a relationship between a stroke of a presser and a load to be applied to a bumper reinforcement from the presser at the time when both ends of the bumper reinforcement are supported and a front surface of a central part of the bumper reinforcement in its longitudinal direction is pressed rearward by the presser.

As illustrated in FIG. 7, a maximum load to the bumper reinforcement 1 of the present embodiment can be improved by about 30% in comparison with the bumper reinforcement BR3 in the related art, and can be improved by about 20% in comparison with the bumper reinforcement BR4 in the related art. Note that, in this experiment, the bumper reinforcements used herein have the same dimension in the vehicle height direction and the same dimension in the vehicle front-rear direction, and their wall portions have the same wall thickness. Further, a dimension of the fourth wall portion 14 of the bumper reinforcement 1 in the vehicle height direction is the same as a dimension of the fourth wall portion W4 of the bumper reinforcement BR3 in the vehicle height direction. A dimension of the fifth wall portion 15 of the bumper reinforcement 1 in the vehicle height direction is the same as a dimension of the fifth wall portion W5 of the bumper reinforcement BR3 in the vehicle height direction.

Further, as illustrated in FIG. 8, it is found that a maximum load at the time when the groove depths $d_{G2}$, $d_{G3}$ of the recessed groove portion G2 and the recessed groove portion G3 are about 5% (a continuous line in FIG. 8) of the dimension (the dimension $w_{11}$ of the first wall portion 11 in the vehicle height direction) of the bumper reinforcement 1 in the vehicle height direction is larger than a maximum load at the time when the groove depths $d_{G2}$, $d_{G3}$ are about 10% (a broken line in FIG. 8) of the dimension of the bumper reinforcement 1 in the vehicle height direction. Thus, from this experiment, it is found that the groove depths $d_{G2}$, $d_{G3}$ should be set to 5% to 10% of the dimension of the bumper reinforcement 1 in the vehicle height direction.

Further, as illustrated in FIG. 9, it is found that a maximum load at the time when the dimensions $w_{14}$, $w_{15}$ of the fourth wall portion 14 and the fifth wall portion 15 in the vehicle height direction are about 35% (an alternate long and short dash line in FIG. 9) of the dimension (the dimension $w_{11}$ of the first wall portion 11 in the vehicle height direction) of the bumper reinforcement 1 in the vehicle height direction is larger than a maximum load at the time when the dimensions $w_{14}$, $w_{15}$ are about 25% (an alternate long and two short dashes line in FIG. 9) of the dimension of the bumper reinforcement 1 in the vehicle height direction. Further, it is found that the maximum load at the time when the dimensions of the fourth wall portion 14 and the fifth wall portion 15 in the vehicle height direction are about 35% (an alternate long and short dash line in FIG. 9) of the dimension of the bumper reinforcement 1 in the vehicle height direction is equivalent to a maximum load at the time when the dimensions of the fourth wall portion 14 and the fifth wall portion 15 are about 40% (a continuous line in FIG. 9) of the dimension of the bumper reinforcement 1 in the vehicle height direction. Thus, from this experiment, it is found that the dimensions of the fourth wall portion 14 and the fifth wall portion 15 in the vehicle height direction should be set to 25% to 35% of the dimension of the bumper reinforcement 1 in the vehicle height direction.

As described above, according to the present embodiment, it is possible to provide the bumper reinforcement 1 as a vehicle frame member having improved impact absorption performance as compared to the related art.

The vehicle frame member of the disclosure includes a first wall portion formed into a band plate shape extending in a predetermined direction, a second wall portion formed into a band plate shape extending in the predetermined direction, and a third wall portion formed into a band plate shape extending in the predetermined direction. The second wall portion extends in a first direction from one end of the first wall portion in a width direction of the first wall direction. The third wall portion extends in a second direction from the other end of the first wall portion in the width direction of the first wall direction. A first recessed groove portion extending in the predetermined direction is formed on an outer surface of the second wall portion. A second recessed groove portion extending in the predetermined direction is formed on an outer surface of the third wall portion. Moreover, the first direction and the second direction may be the same direction and may be a wall thickness direction of the first wall portion. The second wall portion and the third wall portion may be opposed to each other. Moreover, a groove depth of the first recessed groove portion may be set to be greater than or equal to 5% and less than or equal to 10% of a dimension of the first wall portion in the width direction of the first wall portion. A groove depth of the second recessed groove portion may be set to be greater than or equal to 5% and less than or equal to 10% of the dimension of the first wall portion in the width direction of the first wall portion.

With such an embodiment, when a load perpendicular to a wall surface of the first wall portion (perpendicular to the predetermined direction) is applied to the first wall portion of the vehicle frame member, the vehicle frame member deforms (bends). Like the bumper reinforcement BR1, BR2, BR3, BR4 in the related art, in a case where the second wall portion and the third wall portion are flat-shaped, a stress is easily concentrated on the central parts of the second wall portion and the third wall portion in the vehicle front-rear direction in the course of deformation of the vehicle frame member. Accordingly, at the initial stage of the course of deformation of the vehicle frame member, the second wall portion and the third wall portion buckle from the central parts. In contrast, in the vehicle frame member according to the present embodiment, the first recessed groove portion and the second recessed groove portion extending in the predetermined direction are respectively formed on the second wall portion and the third wall portion. Hereby, the stress is dispersed to three parts, i.e., the first recessed groove portion and parts on both sides of the first recessed groove portion, in the second wall portion. Further, the stress is dispersed to three parts, i.e., the second recessed groove portion and parts on both sides of the second recessed groove portion, in the third wall portion. In view of this, according to the present embodiment, the second wall portion and the third wall portion can hardly buckle in comparison with the case where the second wall portion and the third wall portion are flat-shaped. This makes it possible to improve impact absorption performance of the vehicle frame member.

The vehicle frame member may further include a fourth wall portion formed into a band plate shape extending in the predetermined direction and a fifth wall portion formed into a band plate shape extending in the predetermined direction. The fourth wall portion may extend toward the third wall portion from an end of the second wall portion in a width direction of the second wall portion, the end of the second wall portion being on an opposite side to the first wall portion. The fifth wall portion may extend toward the second wall portion from an end of the third wall portion in a width direction of the third wall portion, the end of the third wall portion being on the opposite side to the first wall portion. An end of the fourth wall portion in a width direction of the fourth wall portion, the end being on an opposite side to the second wall portion, may be turned around toward the first wall portion. An end of the fifth wall portion in a width direction of the fifth wall portion, the end being on an opposite side to the third wall portion, may be turned around toward the first wall portion. A dimension of the fourth wall portion may be set to be greater than or equal to 25% and less than or equal to 35% of the dimension of the first wall portion in the width direction of the first wall portion. A dimension of the fifth wall portion may be set to be greater than or equal to 25% and less than or equal to 35% of the dimension of the first wall portion in the width direction of the first wall portion.

With such an embodiment, in the course of deformation of the vehicle frame member, stresses (pulling stresses) are applied, along the predetermined direction, to parts (that is, the fourth wall portion and the fifth wall portion) opposite to a part to which the load is applied. Like the bumper reinforcement BR1, BR2, BR3 in the related art, in a case where a side surface opposite to the first wall portion is opened (the fourth wall portion and the fifth wall portion are distanced from each other), the stresses are easily concentrated on tip ends (see FIG. 11 to FIG. 13) of the fourth wall portion and the fifth wall portion in the course of deformation of the vehicle frame member. Accordingly, at the initial stage of the course of deformation of the vehicle frame member, cracks are caused in the fourth wall portion and the fifth wall portion from the tip ends, and after that, the vehicle frame member breaks (see FIG. 15). In contrast, in the vehicle frame member according to the present embodiment, the tip ends of the fourth wall portion and the fifth wall portion are turned around. Accordingly, the stress is dispersed at the tip ends thus turned around. Accordingly, according to the present embodiment, cracks can be hardly caused in the tip ends of the fourth wall portion and the fifth wall portion in comparison with the case where the fourth wall portion and the fifth wall portion are flat-shaped. This makes it possible to further improve impact absorption performance of the vehicle frame member.

Further, a cross section of the vehicle frame member may have an opening. With such an aspect, in a case of performing heat treatment on the vehicle frame member, it is possible to easily remove oxide formed inside the vehicle frame member in the heat treatment. Further, it is possible to easily apply a paint for rust prevention to the inside of the vehicle frame member.

Further, the present disclosure is not limited to the above embodiment, and various alterations can be made within a range that does not deviate from the object of the present disclosure.

Figure 10:
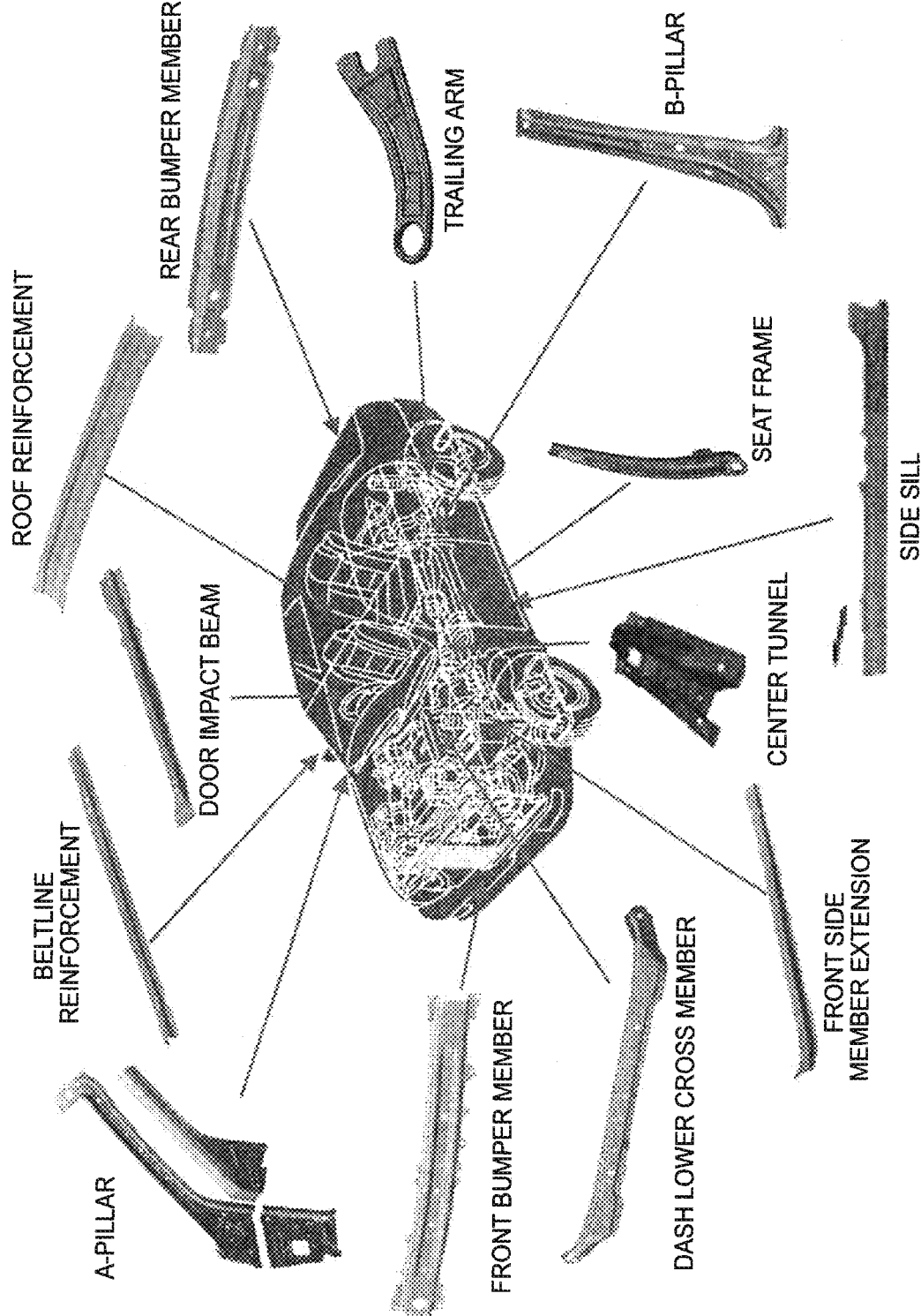
FIG. 10 is a schematic view illustrating examples of a vehicle frame member to which the present disclosure can be applied.

The example illustrated in FIGS. 2 to 4 is an example in which the vehicle frame member of the present disclosure is applied to the bumper reinforcement 1 for the vehicle, but the present disclosure is also applicable to any frame member as illustrated in FIG. 10.

What is claimed is:

1. A vehicle frame member comprising:
   a first wall portion formed into a band plate shape extending in a predetermined direction;
   a second wall portion formed into a band plate shape extending in the predetermined direction, the second wall portion extending in a first direction from one end of the first wall portion in a width direction of the first wall portion; and
   a third wall portion formed into a band plate shape extending in the predetermined direction, the third wall portion extending in a second direction from the other end of the first wall portion in the width direction of the first wall portion, wherein:
   a first recessed groove portion extending in the predetermined direction is formed on an outer surface of the second wall portion,
   a second recessed groove portion extending in the predetermined direction is formed on an outer surface of the third wall portion, and
   the vehicle frame member further comprises
   a fourth wall portion formed into a band plate shape extending in the predetermined direction, the fourth wall portion extending toward the third wall portion from an end of the second wall portion in a width direction of the second wall portion, the end of the second wall portion being on an opposite side to the first wall portion; and
   a fifth wall portion formed into a band plate shape extending in the predetermined direction, the fifth wall portion extending toward the second wall portion from an end of the third wall portion in a width direction of the third wall portion, the end of the third wall portion being on the opposite side to the first wall portion, wherein:
   an end of the fourth wall portion in a width direction of the fourth wall portion, the end being on an opposite side to the second wall portion, is turned around toward the first wall portion, and
   an end of the fifth wall portion in a width direction of the fifth wall portion, the end being on an opposite side to the third wall portion, is turned around toward the first wall portion.

2. The vehicle frame member according to claim 1, wherein:
   the first direction and the second direction are the same direction and are a wall-thickness direction of the first wall portion; and
   the second wall portion and the third wall portion are opposed to each other.

3. The vehicle frame member according to claim 1, wherein
   a cross section of the vehicle frame member has an opening.

4. The vehicle frame member according to claim 1, wherein:
   a groove depth of the first recessed groove portion is set to be greater than or equal to 5% and less than or equal to 10% of a dimension of the first wall portion in the width direction of the first wall portion; and
   a groove depth of the second recessed groove portion is set to be greater than or equal to 5% and less than or equal to 10% of the dimension of the first wall portion in the width direction of the first wall portion.

5. The vehicle frame member according to claim 1, wherein:
   a dimension of the fourth wall portion in the width direction of the fourth wall portion is set to be greater than or equal to 25% and less than or equal to 35% of a dimension of the first wall portion in the width direction of the first wall portion; and
   a dimension of the fifth wall portion in the width direction of the fifth wall portion is set to be greater than or equal to 25% and less than or equal to 35% of the dimension of the first wall portion in the width direction of the first wall portion.

* * * * *